US009936335B2

(12) United States Patent
Wolman et al.

(10) Patent No.: US 9,936,335 B2
(45) Date of Patent: Apr. 3, 2018

(54) MOBILE COMPUTING DEVICE APPLICATION SHARING

(71) Applicant: Microsoft Corporation, Redmond, WA (US)

(72) Inventors: Alastair Wolman, Seattle, WA (US); Nicholas D. Lane, Beijing (CN); David Chu, Bellevue, WA (US); Thomas Moscibroda, Beijing (CN); Jaebaek Seo, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/712,981

(22) Filed: Dec. 13, 2012

(65) Prior Publication Data
US 2014/0170978 A1    Jun. 19, 2014

(51) Int. Cl.
*H04W 4/00*    (2009.01)
*H04B 5/00*    (2006.01)
(Continued)

(52) U.S. Cl.
CPC .......... *H04W 4/008* (2013.01); *G06F 3/1454* (2013.01); *G06F 9/54* (2013.01); *G09G 2370/04* (2013.01); *G09G 2370/16* (2013.01)

(58) Field of Classification Search
CPC ..... H04W 4/008; H04W 4/003; H04W 4/005; H04B 5/0031; G06F 3/1454
(Continued)

(56) References Cited

U.S. PATENT DOCUMENTS 8,219,703 B2 *   7/2012   Sparre ................. G06Q 20/102
                                                                                  358/1.15
2008/0137690 A1 *   6/2008   Krantz ................. H04Q 3/0025
                                                                                   370/503
(Continued)

FOREIGN PATENT DOCUMENTS

CN          1622549 A      6/2005
CN      101453323 A      6/2009
(Continued)

OTHER PUBLICATIONS

"International Search Report & Written Opinion for PCT Patent Application No. PCT/US2013/075178", dated Mar. 27, 2014, filed Dec. 13, 2013, 9 Pages.
(Continued)

*Primary Examiner* — Andrew Wendell
(74) *Attorney, Agent, or Firm* — Medley, Behrens & Lewis, LLC

(57) ABSTRACT

Technologies pertaining to sharing an application installed on a mobile computing device with another computing device are described herein. An indication is received that the application is desirably shared with the another computing device. Responsive to receiving such indication, a communications channel is automatically established between the mobile computing device and the another computing device, and display data generated at the mobile computing device is transmitted to the another computing device by way of the communications channel. The display data is displayed on the another computing device.

19 Claims, 11 Drawing Sheets

(51) Int. Cl.
*G06F 9/54* (2006.01)
*G06F 3/14* (2006.01)

(58) Field of Classification Search
USPC ....... 455/41.1, 41.2, 41.3, 66.1, 67.7, 552.1, 455/556.1, 566
See application file for complete search history.

(56) References Cited

U.S. PATENT DOCUMENTS

| | | |
|---|---|---|
| 2009/0111378 A1* | 4/2009 | Sheynman et al. .......... 455/41.1 |
| 2010/0261507 A1 | 10/2010 | Chang et al. |
| 2010/0312625 A1* | 12/2010 | Miller ...................... A63F 1/02 705/14.5 |
| 2012/0115518 A1* | 5/2012 | Zeira ..................... H04W 8/005 455/500 |
| 2012/0254348 A1* | 10/2012 | Chaturvedi et al. .......... 709/217 |
| 2012/0262379 A1 | 10/2012 | King |
| 2012/0304077 A1 | 11/2012 | Hornback, Jr. et al. |
| 2013/0050259 A1* | 2/2013 | Ahn ..................... G06F 3/1454 345/633 |
| 2013/0151993 A1* | 6/2013 | Mayya ................ H04L 12/1859 715/758 |
| 2013/0225087 A1* | 8/2013 | Uhm ...................... H04L 67/34 455/41.3 |
| 2014/0111415 A1* | 4/2014 | Gargi et al. ................... 345/156 |
| 2014/0274021 A1* | 9/2014 | Jang ........................ H04W 8/22 455/418 |

FOREIGN PATENT DOCUMENTS

| | | |
|---|---|---|
| EP | 1536612 A1 | 6/2005 |
| TW | 200522669 A | 7/2005 |

OTHER PUBLICATIONS

Tysowski, et al., "Peer to Peer Content Sharing on Ad Hoc Networks of Smartphones", In International Wireless Communications and Mobile Computing Conference, Jul. 4, 2011, pp. 1445-1450.

Le, et al., "MicroPlay: A Networking Framework for Local Multiplayer Games", In Proceedings of the First ACM International Workshop on Mobile Gaming, Aug. 13, 2012, pp. 13-18.

"Office Action Issued in European Patent Application No. 13818091.4", dated Oct. 9, 2015, 5 Pages.

"Summons to Attend Oral Proceedings Issued in European Patent Application No. 13818091.4", dated Apr. 10, 2017 Pages.

Palazzi, et al., "A Delay/Disruption Tolerant Solution for Mobile-to-Mobile File Sharing", Wireless Days (WD), 2010 IFIP, IEEE, Oct. 20, 2010, pp. 1-5.

Moghadam, et al., "7DS—A Modular Platform to Develop Mobile Disruption-Tolerant Applications", Next Generation Mobile Applications, Services and Technologies, 2008. NGMAST'08, The Second International Conference on, IEEE, Sep. 16, 2008.

Jabbar, et al., "Framework for Enhancing P2P Communication Protocol on Mobile Platform", The International Conference on Informatics and Applications (ICIA2012), The Society of Digital Information and Wireless Communication, 2012, pp. 8-18.

"First Office Action and Search Report Issued in Chinese Patent Application No. 201380065524.2", dated Feb. 2, 2018, 13 Pages.

* cited by examiner

MOBILE COMPUTING DEVICE APPLICATION SHARING

BACKGROUND

Mobile computing devices, such as smart phones, are fast becoming ubiquitous. Specifically, the number of users of smart phones is expected to reach several billion in the next few years. Other mobile computing devices are also gaining in popularity, such as tablet computing devices (sometimes referred to as slate computing devices), dedicated e-readers, mobile multimedia devices, mobile gaming devices, etc.

In an example, a smart phone is configured to perform multiple tasks. For instance, the smart phone can have numerous applications installed thereon, including but not limited to a web browser, a word processing application, a document reader application, a spreadsheet application, etc. Many special-purpose applications are made available for smart phones by way of an application repository that is accessible by way of a network connection.

Relatively recently, gaming applications that can be installed on mobile computing devices have become incredibly popular. Such gaming applications range from those with relatively simple two-dimensional graphics to computationally expensive gaming applications that involve relatively fast rendering of three-dimensional scenes. Currently, a user of a mobile computing device can access a repository of games through utilization of a mobile computing device, and can select a particular gaming application for download and installation on the mobile computing device. In an example, a gaming application in the repository may be available for purchase to users for a set fee. In another example, a gaming application can be supported by advertisements that are presented to a user during gameplay. Therefore, a user can download and install such gaming application at no charge, but is provided with certain advertisements when playing the game. In still another example, a gaming application can be available for free, but can be configured to generate revenue internally, for instance, through sale of virtual objects that can be used in gameplay.

While a number and type of applications (including gaming applications) available for download and installation on mobile computing devices has increased, collaboration between users of mobile computing devices with respect to an application is often difficult. For instance, if two users wish to participate in a multi-player game with one another, both users must have the gaming application installed on their respective mobile computing devices, and must typically coordinate through a remote server (which can cause difficulties with respect to gaming applications that require low latency).

SUMMARY

The following is a brief summary of subject matter that is described in greater detail herein. This summary is not intended to be limiting as to the scope of the claims.

Described herein are various technologies pertaining to application sharing with respect to a mobile computing device, including but not limited to a mobile telephone or tablet computing device. A mobile computing device may have an application installed thereon. Such application can be any suitable application, but in an exemplary embodiment, the application can be a gaming application. Another computing device (or multiple other computing devices) can leverage resources of the mobile computing device such that the application can be tested/shared on the another computing device without requiring the another computing device to have the application installed thereon, and without requiring the mobile computing device and the another computing device to execute a same operating system. Thus, graphics data to be displayed on the display of the another computing device and audio data that is to be output on speakers of the another computing device is generated at the mobile computing device by executing an instance of such application.

The mobile computing device includes communications hardware that facilitates establishing a peer-to-peer communications channel between the mobile computing device and the another computing device (which may also be a mobile computing device). For instance, a wireless radio in the mobile computing device can include an antenna and instructions for establishing a near field communications channel between the mobile computing device and the another computing device, as well as a higher bandwidth peer-to-peer communications channel.

In an exemplary embodiment, the mobile computing device can receive an indication that the application installed on the mobile computing device is desirably shared with the another computing device. For instance, such indication can be a near field communications (NFC) tap, wherein the first mobile computing device and the another computing device are placed in close proximity to one another. Responsive to receiving the indication that the application is desirably shared with the another computing device, a communications channel between the mobile computing device and the another computing device can be automatically established. In an exemplary embodiment, such communications channel can be a peer-to-peer communications channel, and the communications protocol can be Wi-Fi Direct.

Additionally, responsive to receiving the indication that the application is desirably shared with the another computing device, an instance of the application can be executed on the mobile computing device. When executed on the mobile computing device, the instance of the application can generate output data, wherein the output data comprises at least one of display data or audio data. The mobile computing device can encode such output data to generate encoded data, wherein the encoded data is transmitted over the communications channel to the another computing device. Encoding of the output data can include compressing such output data to facilitate transmittal of data over the communications channel.

The encoded data is decoded at the another computing device, such that the at least one of the display data or audio data is received at the another computing device. In an exemplary embodiment, the mobile computing device and the another computing device can be configured such that the another mobile computing device can display graphical data generated at the mobile computing device as well as output/replay audio data generated at the mobile computing device. Therefore, from the perspective of a user of the another computing device, such user can employ the application as if it were installed on the another computing device, thereby allowing the user to test/use the application even though such application is not installed on the another computing device.

Additionally, a user of the mobile computing device can perform some other task while the user of the another computing device is utilizing the application that is being executed at the mobile computing device. For example, the user of the mobile computing device can utilize a web browser to view a web page on the mobile computing device while the user of the another computing device is accessing a gaming application that is installed and executed on the mobile computing device.

In another exemplary embodiment, the application can be a gaming application, and a user of the mobile computing device and the user of the another computing device can simultaneously play such gaming application. Pursuant to an example, the user of the mobile computing device may be playing the gaming application on the mobile computing device, and the mobile computing device can receive an indication that a user of the another computing device desirably plays the gaming application simultaneously with the user of the mobile computing device. Responsive to receiving such indication, a communication channel can be established between the mobile computing device and the another computing device (which may also be a mobile computing device). In an exemplary embodiment, the mobile computing device can execute multiple instances of the gaming application in the first mobile computing device. For instance, the mobile computing device can spawn a first virtual machine and a second virtual machine, and can execute a first instance of the gaming application in the first virtual machine while simultaneously executing a second instance of the gaming application in the second virtual machine. Output data generated by the first instance of the gaming application (e.g. display data and audio data) can be provided to the display/speakers of the mobile computing device, while output data generated by the second instance of the gaming application can be encoded and transmitted over the communication channel to the another computing device.

A gaming engine (or respective instances thereof) on the mobile computing device can be accessed by the first instance of the gaming application and the second instance of the gaming application, such that the user of the mobile computing device and the user of the another computing device can play the gaming application simultaneously, possibly in a multi-player mode. In another exemplary embodiment, a developer of the gaming application can develop such game to support multi-player scenarios, such that a single instance of the gaming application can be executed on the mobile computing device, and the instance of the gaming application can generate separate data streams for the mobile computing device and the another computing device, respectively.

Other aspects will be appreciated upon reading and understanding the attached figures and description.

DETAILED DESCRIPTION

Figure 1:
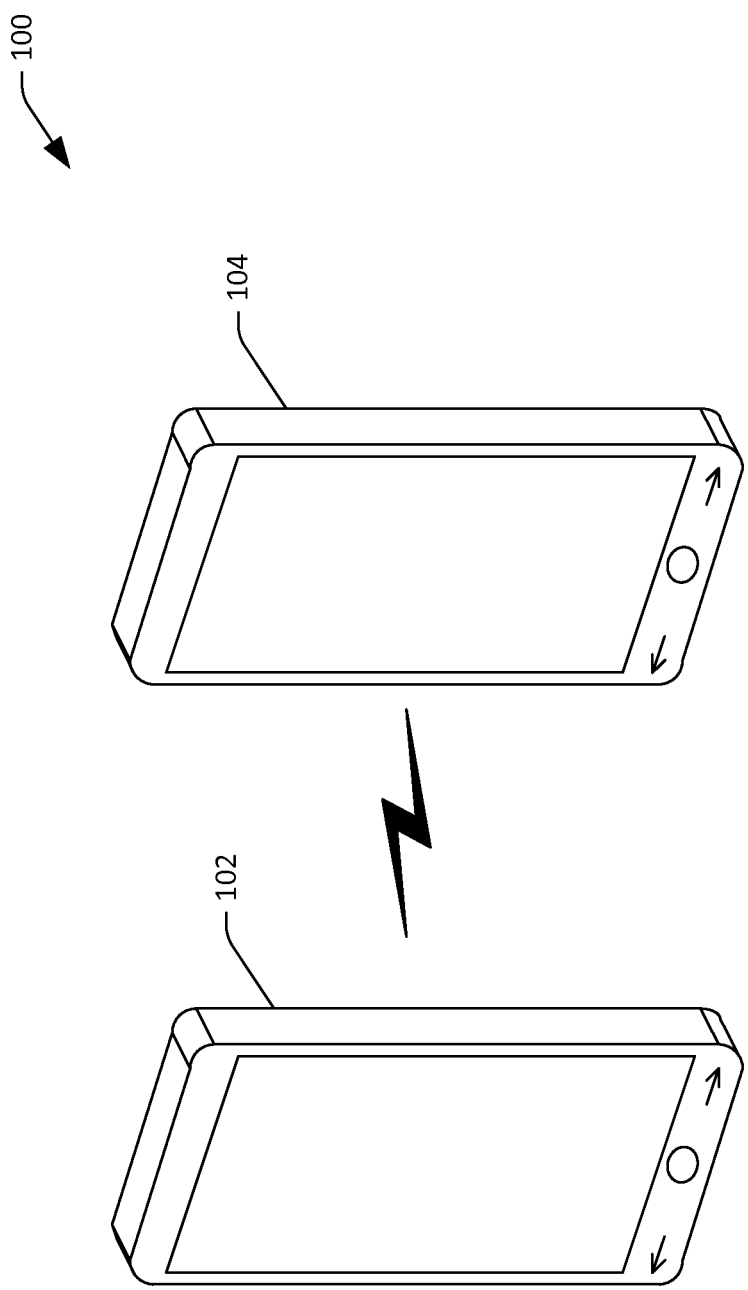
FIG. 1 illustrates an exemplary system that facilitates on-demand application sharing.

Various technologies pertaining to sharing an application installed on a mobile computing device with another computing device will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates on-demand application sharing is illustrated. The system 100 comprises a first mobile computing device 102 and a second mobile computing device 104. The first mobile computing device 102 and the second mobile computing device 104 are in communication by way of a communication channel, which can be established through utilization of any suitable communications media (e.g., wireless, wired, or a combination thereof). The first mobile computing device 102 has an application installed thereon, and a user of the second mobile computing device 104 desires access to the application. The user of the second mobile computing device 104 can set forth some indication that the application is desirably employed by such user, and the first mobile computing device 102 can receive the indication.

Responsive to receiving the indication, the first mobile computing device 102 can execute an instance of the application installed thereon, and cause graphical data and/or audio data generated by the first instance of the application to be transmitted to the second mobile computing device 104 over the communication channel. The graphical data is displayed on the display screen of the second mobile computing device 104, and the audio data is output on speakers of the second mobile computing device 104. The user of the second mobile computing device 104 can provide input to the application through utilization of a suitable interface, such as keys, a touch-screen, a microphone, or the like. Such input is transmitted over the communication channel to the first mobile computing device 102, and is provided to the application executing thereon. The user of the first mobile computing device 102, as will be described in greater detail below, can simultaneously execute another instance of the application, execute a different application, or remain idle relative to the first mobile computing device 102. It can therefore be ascertained that the user of the second mobile computing device 104 can have the perception that the application is executing on the second mobile computing device 104, even though such application is not installed on the second mobile computing device 104.

Figure 2:
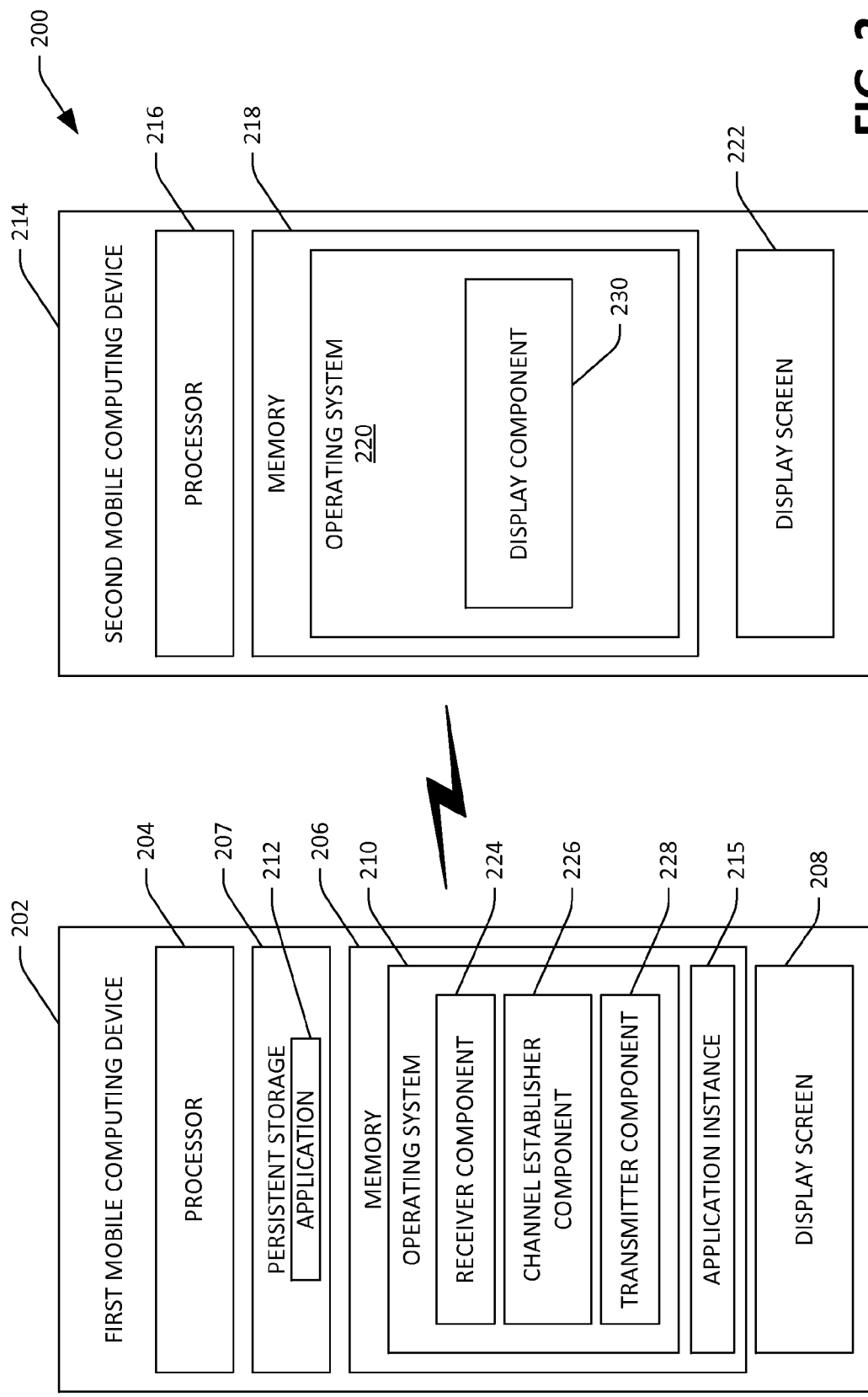
FIG. 2 illustrates an exemplary mobile computing device configured to share an application installed thereon with another computing device.

With reference now to FIG. 2, an exemplary system 200 that facilitates sharing of an application installed on a mobile computing device is illustrated. The system 200 comprises a first mobile computing device 202. The first mobile computing device 202 can be any suitable mobile computing device, including but not limited to a mobile telephone (a smart phone), a tablet computing device (sometimes referred to as a slate computing device), a dedicated e-reader, a laptop computing device, a portable media player, or other suitable portable computing device. The first mobile computing device 202 comprises a processor 204 and a memory 206, wherein the processor 204 executes instructions that are retained in the memory 206. The first mobile computing device 202 also includes additional persistent storage 207, which can be a disk, flash memory, or other suitable data storage. Moreover, the first mobile computing device 202 may optionally comprise interfaces that are configured to accept other storage devices, such as a memory card, a flash drive, etc.

The first mobile computing device 202 additionally comprises a display screen 208. While the display screen 208 is shown as being integral to the first mobile computing device 202, it is to be understood that the display screen 208 may be external to the first mobile computing device 202, and may be coupled to the first mobile computing device 202 by way of a suitable interface.

The memory 206 comprises an operating system 210 that is executed by the processor 204. The persistent storage 207 comprises an application 212 that has been installed on the first mobile computing device 202 and is designed to execute on the first mobile computing device 202 in accordance with the operating system 210. The application 212 can be any suitable type of application, including a word processing application, a slideshow presentation application, a spreadsheet application, an application configured to retrieve latest news items, a document reader application, a video presentation application, an application configured to display social networking information, a message broadcasting application, a photograph broadcasting application, a photograph editing application, amongst others.

In an exemplary embodiment, the application 212 can be a gaming application, wherein the gaming application may be a single player gaming application or a multi-player gaming application. For instance, the gaming application can be pre-installed on the first mobile computing device 202, such that the gaming application is included in the first mobile computing device 202 when purchased by a customer. In another example, a user of the first mobile computing device 202 can access a repository of applications and can select the gaming application for installation on the first mobile computing device 202. For instance, the gaming application can be downloaded from the repository and subsequently installed on the first mobile computing device 202. In such an embodiment, the user may pay a particular price for downloading and installing the gaming application. Alternatively, the gaming application can be downloaded and installed free of charge, and may optionally be advertisement-supported (when the gaming application is executed, advertisements are provided to the user of the gaming application).

The system 200 further comprises a second mobile computing device 214. In an exemplary embodiment, the second mobile computing device 214 can be relatively proximate to the first mobile computing device 202 (e.g., in a same room with the first mobile computing device 202, within a few meters from the first mobile computing device 202, etc.). Alternatively, the second mobile computing device 214 can be remotely located from the first mobile computing device 202, but may be in communication with one another by way of a suitable network connection. Furthermore, while shown as being a mobile computing device, it is to be understood that in some embodiments the second mobile computing device 214 can be a stationary computing device, such as a conventional desktop computing device, a projector with computing components, a television, etc.

The second mobile computing device 214 comprises a processor 216 and a memory 218, wherein the processor 216 executes instructions that are retained in the memory 218. The memory 218 includes an operating system 220 installed thereon. In an exemplary embodiment, the operating system 210 of the first mobile computing device 202 and the operating system 220 of the second mobile computing device 214 are developed by a same developer of operating systems. In another exemplary embodiment, the operating system 210 installed on the first mobile computing device 202 is developed by a first developer, while the operating system 220 installed on the second mobile computing device 214 is developed by a second developer (different than the first developer). The second mobile computing device 214 also comprises a display screen 222 that is configured to display graphical data to a user of the second mobile computing device 214. Again, while the display screen 222 is shown as being integral to the second mobile computing device 214, it is to be understood that in some embodiments, the display screen 222 may be external to the second mobile computing device 214. Further, as shown, the second mobile computing device 214 may fail to have the application 212 installed thereon.

As will be shown and described in detail below, the first mobile computing device 202 can be configured to share the application 212 with the second mobile computing device 214 (and potentially other computing devices). To facilitate sharing of the application 212, resources of the first mobile computing device 202 are employed to execute an instance 215 of the application 212 on the first mobile computing device 202 while causing display and audio data to be transmitted to the second mobile computing device 214 for display/replay thereon. Accordingly, a user of the second mobile computing device 214 can view and interact with the instance 215 of the application 212 executing on the first mobile computing device 202. At the same time, a user of the first mobile computing device 202 may utilize a different application, may utilize another instance of the application 212, or may collaborate with the user of the second mobile computing device 214 using the instance 215 of the application 212 executing on the first mobile computing device 202. Further, the application 212 on the first mobile computing device 202 can be shared with the second mobile computing device 214 regardless of whether the application 212 is installed on the second mobile computing device 214 and regardless of whether the operating systems 210 and 220 are developed by the same developer.

The operating system 210 of the first mobile computing device 202 can include a receiver component 224 that receives an indication that the application 212 on the first computing device 202 is desirably shared with the second mobile computing device 214. In an exemplary embodiment, the receiver component 224 can receive such indication when the first mobile computing device 202 and the second mobile computing device 214 are placed within a threshold distance from one another. For instance, such threshold dish distance can be three inches. In such an embodiment, the first mobile computing device 202 and the second mobile computing device 214 can be configured with hardware and protocols that facilitate establishing of a near field communications (NFC) channel. The receiver component 224 can receive the indication when a NFC tap occurs between the first mobile computing device 202 and the second mobile computing device 214 (e.g., when the first mobile computing device 202 and the second mobile computing device 214 are physically tapped together/placed relatively proximate to one another). In another exemplary embodiment, the first mobile computing device 202 and the second mobile computing device 214 can be configured with radio frequency identifier (RFID) technologies, such that the first mobile computing device 202 can comprise a sensor that outputs a signal when the second mobile computing device 214 becomes sufficiently proximate thereto. It is therefore to be understood that any suitable hardware/communications protocols that can identify when the first mobile computing device 202 and the second mobile computing device 214 are sufficiently proximate to one another is contemplated and intended to fall under the scope of the hereto-appended claims.

In another exemplary embodiment, the receiver component 224 can receive a manual indication set forth by either the user of the first mobile computing device 202 or the user of the second mobile computing device 214 that the application 212 is desirably shared with the second mobile computing device 214. For instance, a service that is accessible by both the first mobile computing device 202 and the second mobile computing device 214 can be utilized in connection with indicating to the first mobile computing device 202 that the application 212 installed on the first mobile computing device 202 is desirably shared with the second mobile computing device 214. For instance, both the user of the first mobile computing device 202 and the user of the second mobile computing device 214 can log into the service and confirm that the respective users of the devices 202 and 214 are contacts with one another. Subsequently, the user of the second mobile computing device 202 can indicate that the application 212 installed on the first mobile computing device 202 is desirably shared with the second mobile computing device 214.

The operating system 210 on the first mobile computing device 202 can additionally comprise a channel establisher component 226 that is configured to establish a communications channel between the first mobile computing device 202 and the second mobile computing device 214 responsive to the receiver component 224 receiving the indication that the application 212 on the first mobile computing device 202 is desirably shared with the second mobile computing device 214. In an exemplary embodiment, the communications channel established by the channel establisher component 226 can be a relatively high bandwidth communications channel. For instance, such channel can be a peer-to-peer communications channel, such that data is transmitted directly between the first mobile computing device 202 and the second mobile computing device 214 (an intermediate access point is not employed to transfer data between the first mobile computing device 202 and the second mobile computing device 214). For example, Wi-Fi Direct can be employed as a communications protocol when establishing the communications channel between the first mobile computing device 202 and the second mobile computing device 214. In another exemplary embodiment, the communications channel established by the channel establisher component 226 may include at least one intermediate access point. For instance, a wireless access point (not shown) in a communications range of both the first mobile computing device 202 and the second mobile computing device 214 can be employed to direct data transfer between the first mobile computing device 202 and the second mobile computing device 214. Thus, Wi-Fi can be employed by the channel establisher component 226 when establishing the communications channel between the first mobile computing device 202 and the second mobile computing device 214.

Further, responsive to the receiver component 224 receiving the indication that the application 212 is desirably shared with the second mobile computing device 214, the instance 215 of the application 212 can be loaded into the memory 206 and executed by the processor 204 on the first mobile computing device 202. Execution of the instance 215 of the application 212 results in the generation of output data, wherein the output data comprises display data and audio data. The display data is data that is to be displayed on a display screen, while the audio data is audio that is desirably output by speakers of a computing device of a user of the application 212.

The operating system 210 comprises a transmitter component 228 that receives the output data from the instance 215 of the application 212 executing on the first mobile computing device 202, encodes the output data in accordance with a protocol that can be employed for transmittal of display/audio data, and transmits the encoded data over the communications channel established by the channel establisher component 226. Encoding of the output data can include compressing the output data. Furthermore, in an exemplary embodiment, the output data can be transmitted over the communications channel without encoding such data.

The operating system 220 of the second mobile computing device 214 comprises a display component 230 that receives the encoded data transmitted by the transmitter component 228 and decodes such encoded data, thereby causing the display data and the audio data in the output data to be displayed on the display screen 222 and/or audibly output from speakers (not shown) of the second mobile computing device 214. Accordingly, the display component 230 is configured with a codec that is used to decode the encoded data. In an exemplary embodiment, if the operating system 220 of the second mobile computing device 214 fails to include the display component 230 (or suitable protocols for decoding the encoded data), the transmitter component 228 can be configured to transmit the display component 230 (or other suitable protocols) over the communications channel established by the channel establisher component 226. Such display component 230 may then be installed on the second mobile computing device 214.

Therefore, the user of the second mobile computing device 214 can use/test the application 212 as if an instance thereof was executing on the second mobile computing device 214. The user of the second mobile computing device 214 may also provide inputs to the instance 215 of the application 212 by way of, for example, a touch sensitive display, spoken commands, a keyboard (hardware or software keyboard), or the like. Inputs received by the second mobile computing device 214 from the user thereof with respect to the instance 215 of the application 212 executing on the first mobile computing device 202 can be transmitted, for example, by the display component 230 to the first mobile computing device 202 by way of the communications channel. In an exemplary embodiment, such input data may not be subject to encoding, as the input data is likely to be relatively small (does not include graphics data), and low latency may be desired. These inputs can be directed to the instance 215 of the application 212 executing on the first mobile computing device 202, such that a state of such instance 214 of the application can be updated. This can in turn cause new output data to be generated by the instance 215 of the application 212 executing on the first mobile computing device 202, which is again encoded and transmitted by the transmitter component 228 over the communications channel between the first mobile computing device 202 and the second mobile computing device 214 established by the channel establisher component 226.

In addition, it is to be understood that, in an exemplary embodiment, communications undertaken between the instance 215 of the application 212 executing on the first mobile computing device 202 (used by the user of the second mobile computing device 214) and a third party device (such as a server hosting a web service) can be vectored through the instance 215 of the application 212 executing on the first mobile computing device 202, and then tunneled via a connection with the third party device established by the first mobile computing device 202. Thus, the user of the second mobile computing device 214 can have the perception of network connectivity by way of a data plan of the first mobile computing device 202. In other embodiments, the second mobile computing device 214 may be prohibited from connecting to third party services for use with the application 212 when an instance of the application 212 is executing on the first mobile computing device 202. In still other embodiments, the instance 215 of the application 212 and/or the second mobile computing device 214 can be configured to receive and transmit data to/from a web service by way of a separate data connection.

Figure 3:
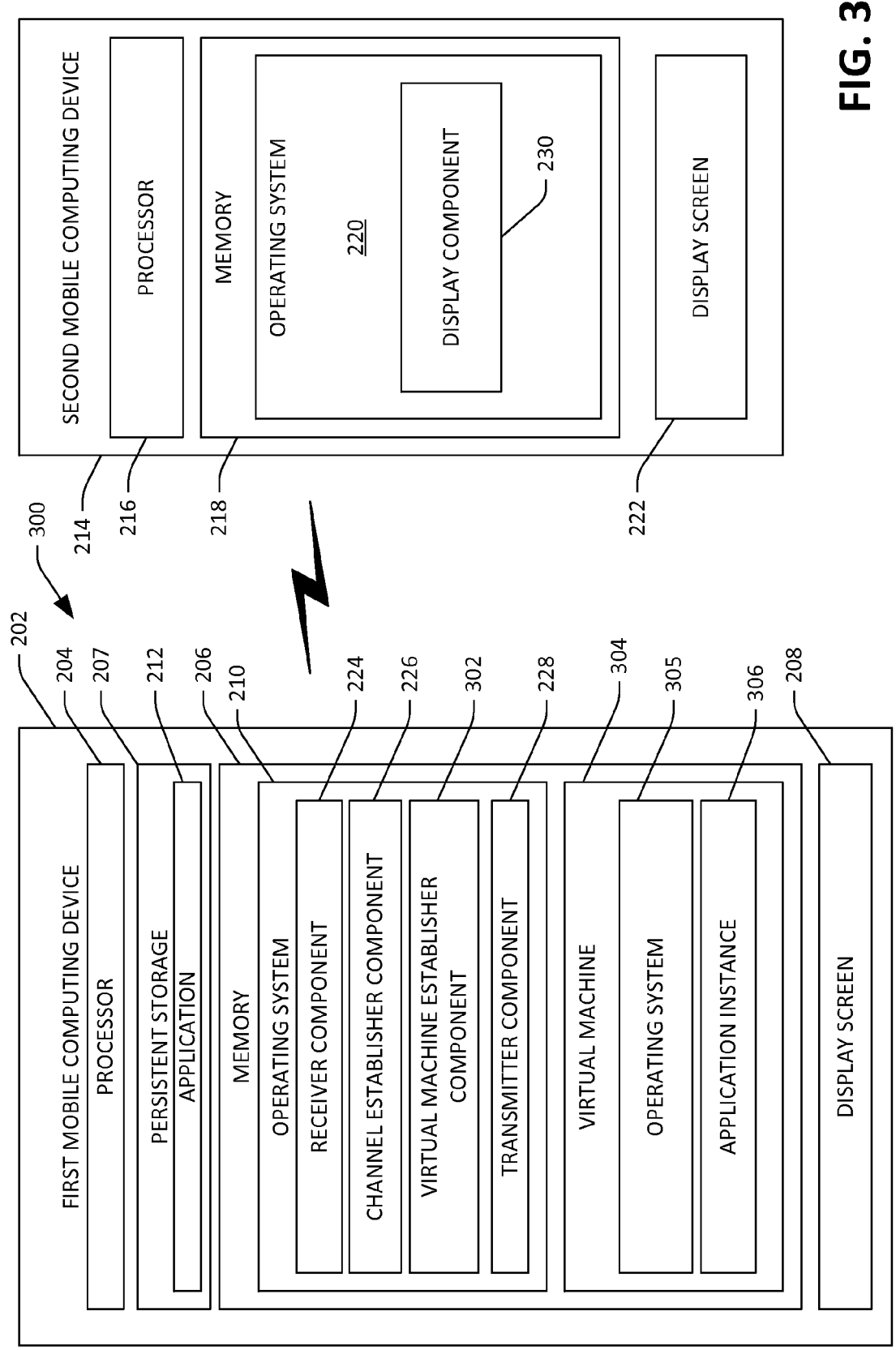
FIG. 3 illustrates an exemplary mobile computing device that is configured to share an application installed thereon with another computing device.

With reference now to FIG. 3, an exemplary system 300 that facilitates sharing of an application installed on the first mobile computing device 202 with the second mobile computing device 214 is illustrated. As described above, the receiver component 224 can receive an indication that the application 212 installed on the first mobile computing device 202 is desirably shared with the second mobile computing device 214. Responsive to receiving such indication, the channel establisher component 226 can establish the communications channel between the first mobile computing device 202 and the second mobile computing device 214. The operating system 210 of the first mobile computing device 202 may additionally comprise a virtual machine establisher component 302 that can be configured to spawn virtual machines to facilitate execution of different instances of the same application on the first mobile computing device 202. Pursuant to an example, the virtual machine establisher component 302 can be in communication with the receiver component 224, and can spawn a virtual machine 304 responsive to the receiver component 224 receiving the indication that the application 212 is desirably shared with the second mobile computing device 214. The virtual machine 304 includes its own operating system 305, and the virtual machine establisher component 302 may then cause an instance 306 of the application 212 to be executed in the virtual machine 304 in accordance with the operating system 305.

As will be shown below, another instance of the application may be executed in another virtual machine on the first mobile computing device 202 such that a user of the first mobile computing device 202 can simultaneously utilize the application 212 while it is also being shared with the second mobile computing device 214. Alternatively, a virtual machine (not shown) may own the operating system 212, and the user of the first mobile computing device 202 may execute another application in such virtual machine while the instance 306 of the application 212 is being executed in the virtual machine 304 for the purposes of sharing the application 212 with the second mobile computing device 214.

As described above, the transmitter component 228 can receive output data generated by the instance 306 of the application and encode such output data for transmittal over the communications channel established by the channel establisher component 226, where it can be decoded by the display component 230 for display on the display screen 222 and replayed over speakers of the second mobile computing device 214. The user of the second mobile computing device 214 may provide input with respect to what is shown on the display screen 222 or replayed over the speakers of the second mobile computing device 214, and such input can be transmitted to the first mobile computing device 202 by way of the communications channel established by the channel establisher component 226. Such input is provided to the instance of the application 306 executing in the virtual machine 304, and the instance of the application 306 can generate updated output data.

While the operating system 210 is shown as comprising the channel establisher component 226 and the transmitter component 228, it is to be understood that the operating system 305 can comprise such components 226 and 228. For example, the virtual machine establisher component 302 can spawn the virtual machine 304 responsive to the receiver component 224 receiving the indication that the application 212 is desirably shared with the second mobile computing device 214. The channel establisher component 226 may be a component of the operating system 305, and can establish the aforementioned communications channel. Similarly, the transmitter component 228 can be a portion of the operating system 305, and can encode and transmit data output from the instance 306 of the application 212. Moreover, while not shown, the memory 206 can comprise a hypervisor, and at least one of the receiver component 224, the channel establisher component 226, the virtual machine establisher component 302, or the transmitter component 228 may be comprised by the hypervisor.

Figure 4:
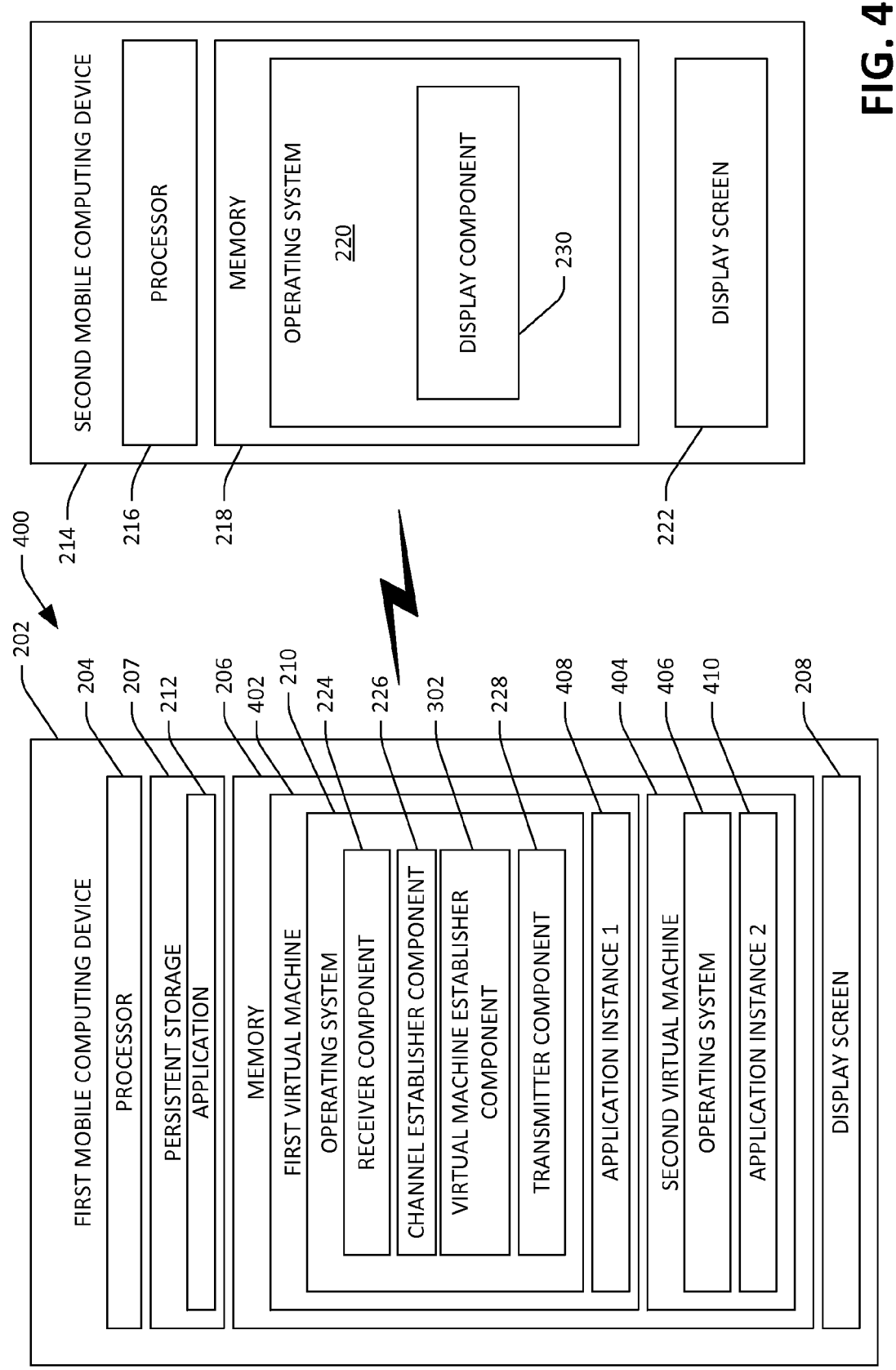
FIG. 4 illustrates an exemplary mobile computing device that is configured to facilitate sharing of an application with another computing device through utilization of multiple virtual machines.

Now referring to FIG. 4, an exemplary system 400 that illustrates simultaneous execution of respective instances of an application by the first mobile computing device 202 to facilitate collaboration or multiplayer gaming is illustrated. In an exemplary embodiment depicted in FIG. 4, the memory 206 can comprise a first virtual machine 402 and a second virtual machine 404, wherein the first mobile computing device 202 comprises a hypervisor (not shown) that causes the first virtual machine 402 to be generated at bootup of the first mobile computing device 202. In another example, the hypervisor may be configured to remain idle at bootup, but subsequently causes the first virtual machine 402 and the second virtual machine 404 to be spawned responsive to the receiver component 224 receiving an indication that the application 212 is desirably shared with the second mobile computing device 214. Further, as mentioned above, while the receiver component 224, the channel establisher component 226, the virtual machine establisher component 302, and the transmitter component 228 are shown as being included in the operating system 210 of the first virtual machine 402, it is to be understood that such components may be included in an operating system 406 of the second virtual machine 404 and/or the hypervisor.

In an exemplary embodiment, the receiver component 224 can receive an indication that the application 212 is desirably executed by a user of the first mobile computing device 202. For example, the user can set forth a command to cause the application 212 to be executed on the first mobile computing device 202. A first instance 408 of the application 212 is loaded into the memory 206 for execution in the first virtual machine 402. Outputs of the first instance 408 of the application 212 can be provided to the display screen 208 and/or speakers (not shown) on the first mobile computing device 202.

The receiver component 224 can also receive an indication that the application 212 is desirably shared with the second mobile computing device 214. The virtual machine establisher component 302, responsive to the receiver component 224 receiving such indication, can spawn the second virtual machine 404. The virtual machine establisher component 302 may then cause a second instance 410 of the application 212 to execute in the second virtual machine 404. Further, as described above, the channel establisher component 226 can establish the communications channel between the first mobile computing device 202 and the second mobile computing device 214, and the transmitter component 228 can encode and transmit output data generated by the second instance 410 of the application 212 executing in the second virtual machine 404 to the second mobile computing device 214 by way of the communications channel. Again, while the transmitter component 228 is shown as being a portion of the operating system 210, it is to be understood that the transmitter component 228 may also or alternatively be a portion of the operating system 406 in the second virtual machine 404 and/or a portion of the hypervisor. The display component 230 can receive the encoded output, decode such output (utilizing a suitable codec), and cause the decoded output to be displayed on the display screen 222 and/or replayed on speakers of the second mobile computing device 214. Inputs received at the second mobile computing device 214 can be transmitted by the display component 230 to the first mobile computing device 202 by way of the communications channel, and can be directed to the second instance 410 of the application 212 executing in the second virtual machine 403.

The architecture set forth in FIG. 4, in an exemplary embodiment, allows for the user of the first mobile computing device 202 and the user of the second mobile computing device 214 to independently interact with the application 212 via the separate application instances executing in the first virtual machine 402 and the second virtual machine 404, respectively. For example, the application 212 may be a slideshow presentation application, and the user of the first mobile computing device 202 can access a first slideshow using such application while a user of the second mobile computing device 214 can access a second slideshow using such application. In another example, the first user and the second user can access the same slideshow but view different slides at the same time.

Figure 5:
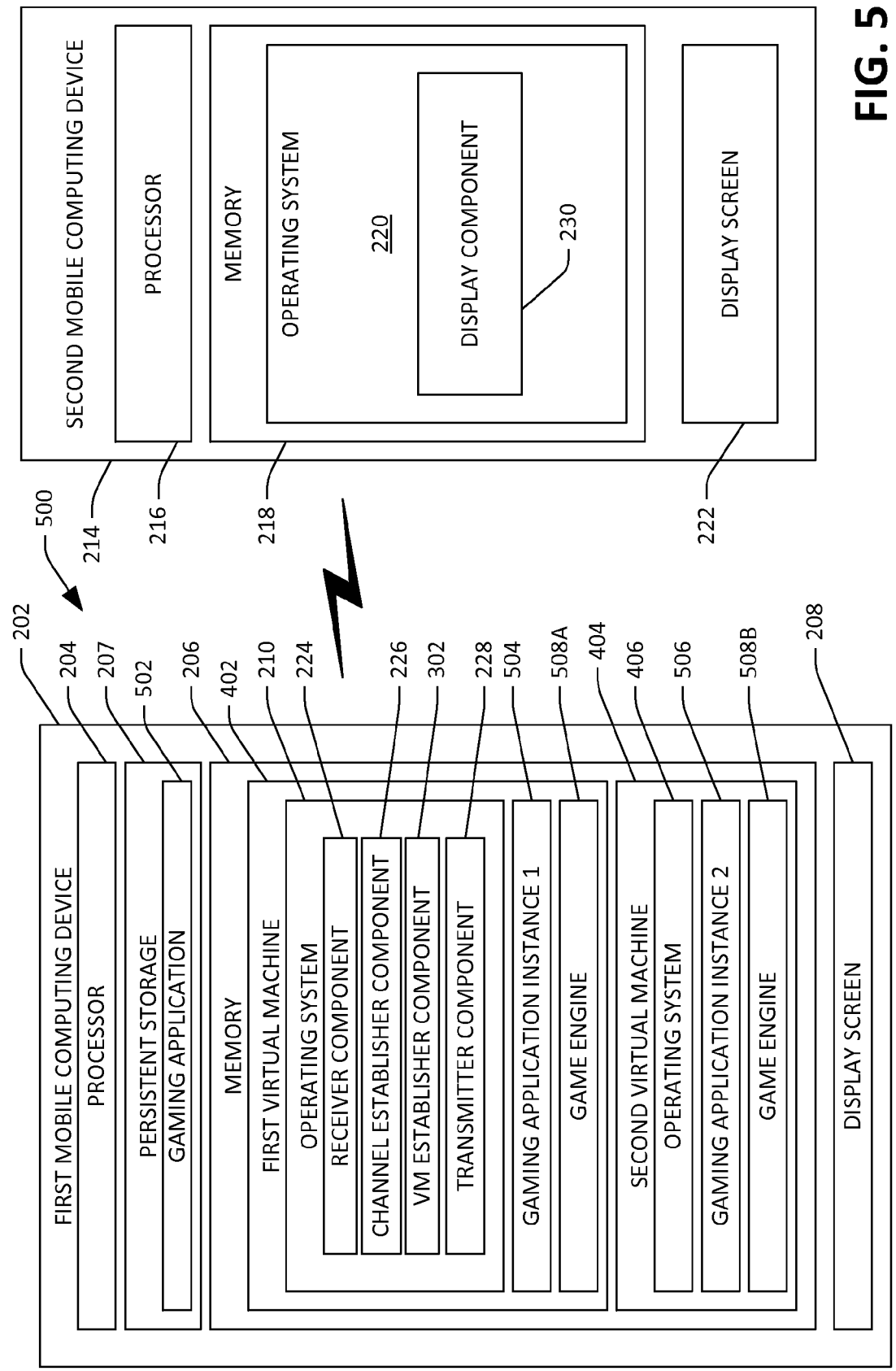
FIG. 5 illustrates an exemplary mobile computing device that is configured to share a gaming application installed on the mobile computing device with another computing device.

Now referring to FIG. 5, an exemplary system 500 that facilitates sharing of a gaming application is illustrated. In the system 500, the persistent storage 207 of the first mobile computing device 202 has a gaming application 502 installed therein. In an exemplary embodiment, the gaming application 502 can be a single player game. Alternatively, the gaming application 502 can be a multi-player game. Additionally, the gaming application 502 may be relatively lightweight in nature with respect to graphics generated thereby. For example, the gaming application 502, when an instance thereof is executed by the processor 204, may output two-dimensional graphics. Alternatively, the gaming application 502 may have three-dimensional graphics rendering associated therewith.

The gaming application 502 may be preinstalled in the persistent storage 207 of the first mobile computing device 202, such that the gaming application 502 resides in the persistent storage 207 at a time that the first mobile computing device 202 is purchased by a user thereof. In another exemplary embodiment, the gaming application 502 can be retrieved from a network-accessible repository of games/applications. As mentioned above, the gaming application 502 can be downloaded and installed on the first mobile computing device 202 responsive to a user of the first mobile computing device 202 paying some set fee for the gaming application 502. In other exemplary embodiments, the gaming application 502 can be installed on the first mobile computing device 202 free of charge, and can be supported by advertisements that are displayed to users when the gaming application 502 is executed. In another embodiment, the gaming application 502 may use other mechanisms for generating revenue, such as sales of in-game objects to players of the gaming application 502.

As noted above, the memory 206 of the first mobile computing device 202 can include the first virtual machine 402 and the second virtual machine 404, wherein the first virtual machine 402 can be utilized prior to the receiver component 224 receiving an indication that the gaming application 502 is desirably shared with the second mobile computing device 214 or subsequent to the receiver component 224 receiving an indication that the gaming application 502 is desirably shared with the second mobile computing device.

Responsive to the receiver component 224 receiving such indication, the channel establisher component 226 can establish a relatively high bandwidth communications channel between the first mobile computing device 202 and the second mobile computing device 214. Additionally, the virtual machine establisher component 302 can spawn, for example, the second virtual machine 406 responsive to the receiver component 224 receiving the indication that the gaming application 502 is desirably shared with the second mobile computing device 214. The first virtual machine 402 may be configured to execute a first instance 504 of the gaming application 502, wherein output data generated by the first instance 504 of the gaming application 502 is displayed on the display screen 208 of the first mobile computing device 202 and/or output by speakers of the first mobile computing device 202. Thus, the user of the first mobile computing device 202 plays the first instance 504 of the gaming application 502 executed in the first virtual machine 402.

The second virtual machine 404 can be spawned prior to the receiver component 224 receiving the indication that the gaming application 502 is desirably shared with the second mobile computing device 214. For example, the second virtual machine 406 can be dedicated to applications/game sharing. In another exemplary embodiment, the virtual machine establisher component 302 can spawn the second virtual machine 406 responsive to the receiver component 224 receiving the indication that the gaming application 502 is desirably shared with the second mobile computing device 214. The second virtual machine 406 is used to execute the operating system 406, which can be another instance of the operating system 210 (and thus may include the same components/functionality that is described as being undertaken by the operating system 210). Additionally, the virtual machine establisher component 302 can cause a second instance 506 of the gaming application 502 to be executed in the second virtual machine 404, wherein output data generated by the second instance 506 of the gaming application 502 is encoded and transmitted to the second mobile computing device 214 over the communications channel established by the channel establisher component 226. The first virtual machine 402 and the second virtual machine 406 can each have a game engine 508 (shown as 508a and 508b) therein, wherein the game engine 508 can include instructions corresponding to graphics, sound, scripting, animation, artificial intelligence, networking, streaming, memory management, threading, localization, support, and the like, wherein such instructions are called by the first instance 504 and the second instance 506 of the gaming application 502 respectively. Thus, in the embodiment shown in FIG. 5, each of the first instance 504 and the second instance 506 of the gaming application 502 has its own respective game engine to access. In other embodiments, however, the game instances 504 and 506 can access a common game engine retained in the memory 206.

As noted above, output data generated by the second instance 506 of the gaming application 502 is encoded and transmitted by the transmitter component 226 over the communications channel established by the channel establisher component 226. The display component 230 of the second mobile computing device 214 can include instructions to decode the received encoded data. Subsequently, graphics data can be displayed on the display screen 222 of the second mobile computing device 214 and audio can be output from speakers of the second mobile computing device 214. Input provided by the user of the second mobile computing device 214 to interfaces of the second mobile computing device 214 (a touch sensitive display, a microphone, a keypad, a static pad, etc.) are transmitted over the communications channel to the first mobile computing device 202, wherein such input is provided to the second instance 506 of the gaming application 502 executing in the second virtual machine 406. The second instance 506 of the gaming application 502 can then generate updated state information/output based upon the received input.

In an exemplary embodiment, the user of the first mobile computing device 202 and the user of the second mobile computing device 214 can play the gaming application 502 entirely separately. Thus, output data (e.g., state information) generated by the first instance 504 of the gaming application 502 is not dependent upon state(s) of the second instance 506 of the gaming application 502 utilized by the user of the second mobile computing device 214. In another exemplary embodiment, the user of the first mobile computing device 202 can play the game in tandem with or versus the user of the second mobile computing device 214. In such an embodiment, the first mobile computing device 202 can be in communication with a server (not shown) that is configured with instructions to update states of games in a multiplayer environment.

Accordingly, at least some state information corresponding to the first instance 504 of the gaming application 502 is transmitted to such server, as well as state information corresponding to the second instance 506 of the gaming application 502. The server can generate output based upon such state information corresponding to the instances 504 and 506, and can transmit updates for the first instance 504 of the gaming application 502 and the second instance 506 of the gaming application 502. Thus, an input provided by a user of the second mobile computing device 214 relative to the second instance 506 of the gaming application 502 can affect state(s) of the first instance 504 of the gaming application 502. Therefore, data displayed on the display screen 208 and/or audio output by speakers of the first mobile computing device 202 may depend upon input provided by a user of the second mobile computing device 214 relative to the second instance 506 of the gaming application 502 executing in the second virtual machine 404 on the first mobile computing device 202. Likewise, an input provided by a user of the first mobile computing device 202 relative to the first instance 504 of the gaming application 502 can affect output of the second instance 506 of the gaming application 502 and can, therefore, affect data that is displayed on the display screen 222 of the second mobile computing device 214 (as well as audio output by speakers of the second mobile computing device 214).

Figure 6:
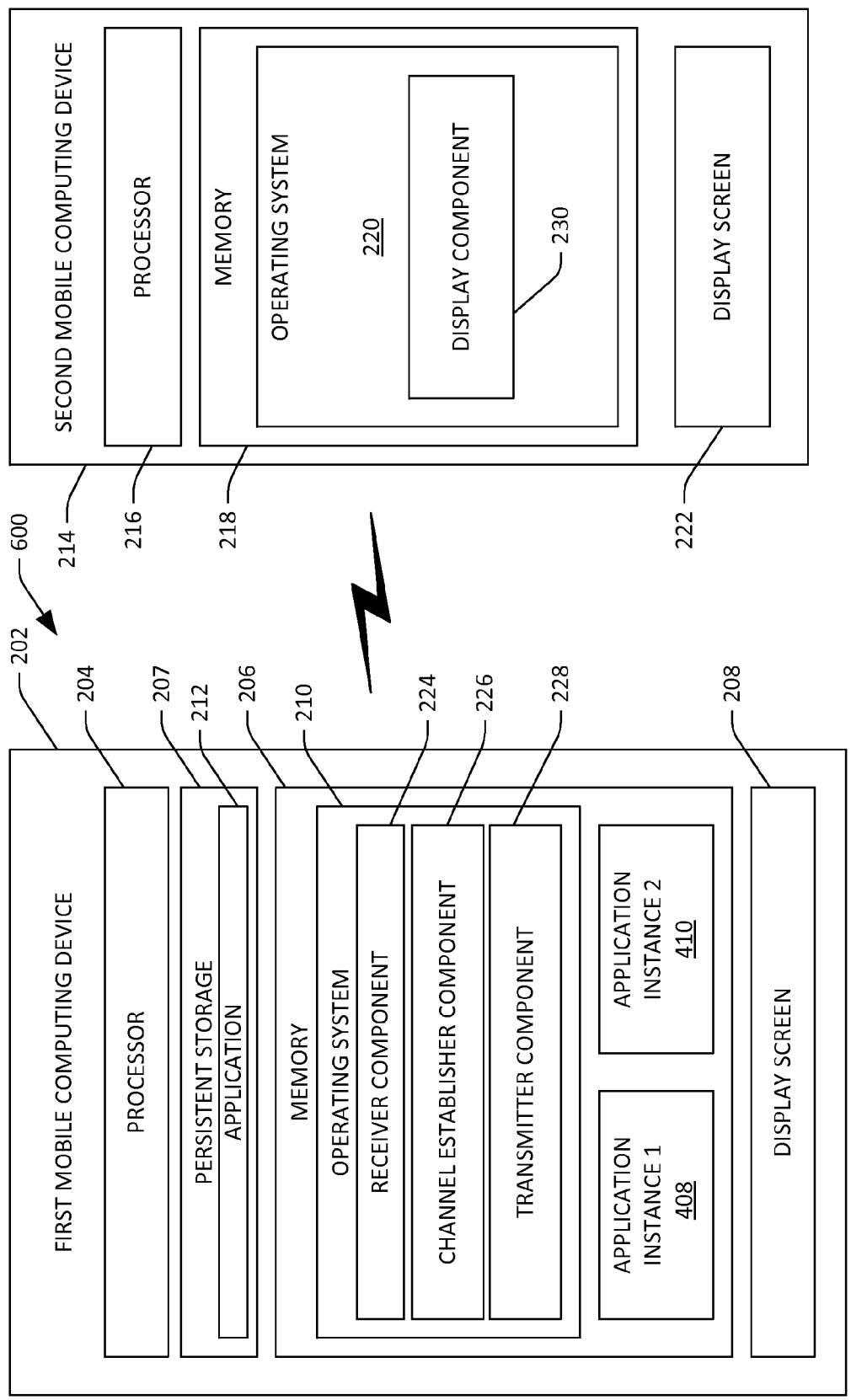
FIG. 6 illustrates an exemplary mobile computing device that is configured to share an application installed thereon with another computing device.

Now referring to FIG. 6, another exemplary system 600 that facilitates sharing of an application on the first mobile computing device 202 with the second mobile computing device 214 is illustrated. In the exemplary embodiment shown in FIG. 6, the operating system 210 installed on the first mobile computing device 202 is configured to allow for multiple instances of the application 212 to be executed without requiring separate virtual machines.

The user of the first mobile computing device 202 may desirably execute the application 212, which causes the first instance 408 of the application 212 to be executed by the processor 204. Responsive to the receiver component 224 receiving an indication that the application 212 is desirably shared with the second mobile computing device 214, the channel establisher component 226 can establish the communications channel between the first mobile computing device 202 and the second mobile computing device 214. Additionally, the second instance 410 of the application 212 can be spawned and executed by the processor 204. The transmitter component 228, as described above, can encode output data generated by the second instance 410 of the application 212 and transmit encoded data over the communications channel, where it is received by the second mobile computing device 214. The display component 230 decodes the encoded data, such that graphics data can be displayed on the display screen 222 and audio data can be output by speakers of the second mobile computing device 214.

In an example, the first instance 408 and the second instance 410 can execute entirely separately from one another. In another exemplary embodiment, the first instance 408 of the application 212 and the second instance 410 of the application 212 can be in communication with one another, such that input provided to one of the instances can affect output generated by the other of the instances of the application 212. Such communication can be undertaken locally in the first mobile computing device 202 or at a separate server that is in network communication with the first mobile computing device 202.

Figure 7:
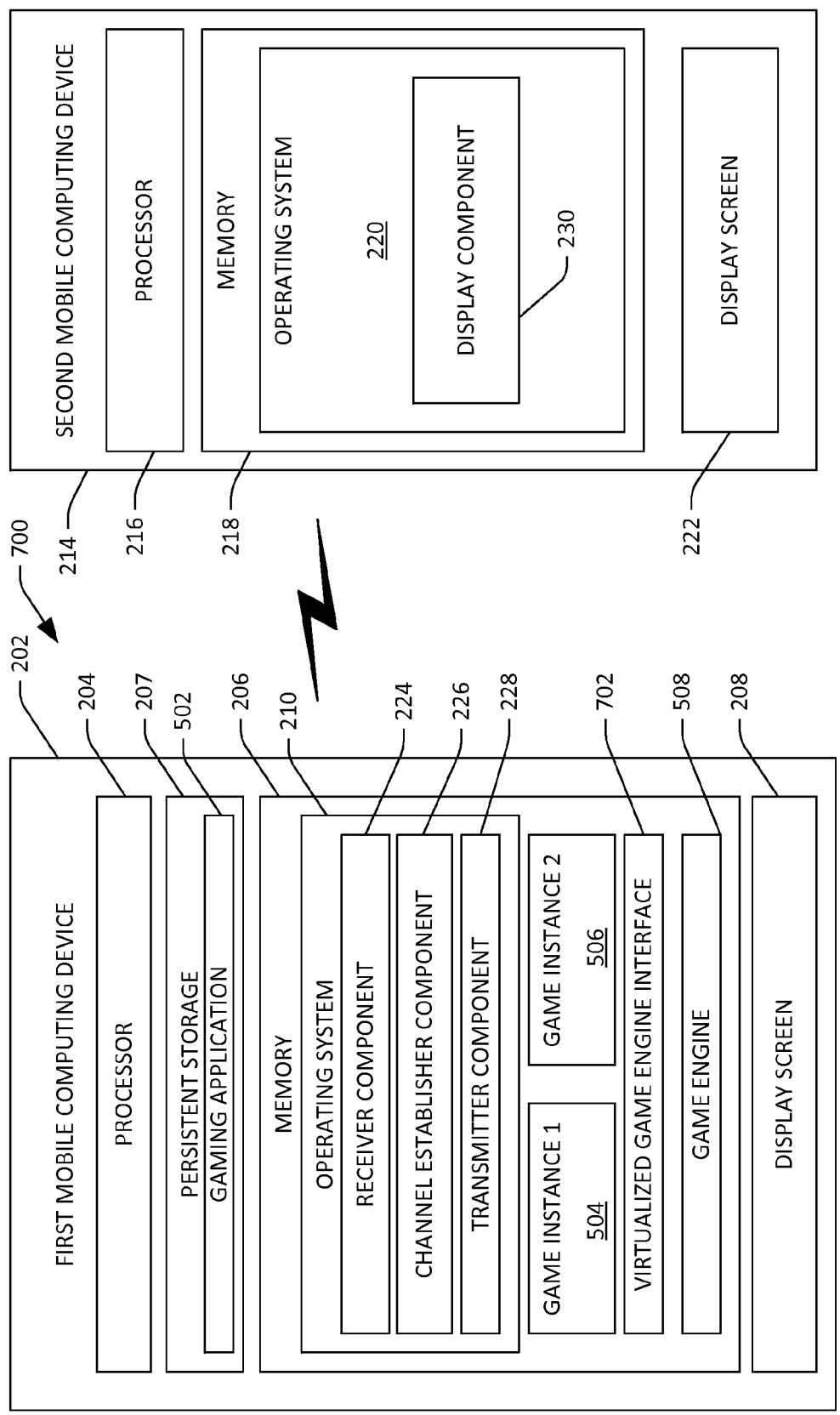
FIG. 7 illustrates an exemplary mobile computing device that facilitates sharing a gaming application installed thereon with another computing device by spawning two instances of the gaming application.

Now referring to FIG. 7, another exemplary system 700 that facilitates sharing the gaming application 502 installed on the first mobile computing device 202 with the second mobile computing device 214 is illustrated. In the exemplary embodiment depicted in FIG. 7, the operating system 210 installed on the first mobile computing device 202 is configured to execute the first instance 504 of the gaming application 502 and the second instance 506 of the gaming application 502 without requiring such instances 504 and 506 to be executed in different virtual machines. Thus, the operating system 210 can spawn, for example, the second instance 506 of the gaming application 502 responsive to the receiver component 224 receiving the indication that the gaming application 502 is desirably shared with the second mobile computing device 214.

In such an embodiment, the operating system 210 can additionally include a virtualized game engine interface 602 that is configured to allow both the first instance 504 of the gaming application 502 and the second instance 506 of the gaming application 502 to simultaneously access the game engine 508 in connection with generating outputs responsive to receipt of input from a user of the first mobile computing device 202 or a user of the second mobile computing device 214.

Additionally, the first instance 504 and the second instance 506 of the gaming application 502 can execute independently, such that the user of the first mobile computing device 202 can play the gaming application 502 in a single player environment or a multiplayer environment that does not include the user of the second mobile computing device 214. Likewise, the user of the second mobile computing device 214 can play the gaming application 502 through use of the second instance 506 of the gaming application 502 in a single player environment or in a multiplayer environment that does not include the user of the first mobile computing device 202.

In another exemplary embodiment, the first instance 504 of the gaming application 502 and the second instance 506 of the gaming application 502 can be in direct communication with one another, such that input to the first instance 504 of the gaming application 502 can affect output of the second instance 506 of the gaming application 502, and vice versa. Further, the first instance 504 of the gaming application 502 and the second instance 506 of the gaming application 502 can be in communication by way of a server that is in network communication with the first mobile computing device 202.

Responsive to the receiver component 224 receiving an indication that the gaming application 502 is desirably shared with the second mobile computing device 214, the channel establisher component 226 can establish the communications channel between the first mobile computing device 202 and the second mobile computing device 214. Additionally, the first instance 504 and/or the second instance 506 of the gaming application 502 can be spawned by the operating system 210 and executed by the processor 204. The transmitter component 228 can encode output data generated by the second instance 506 of the gaming application 512 and transmit such encoded output data over the communications channel, where the encoded output data is received by the second mobile computing device 214. The display component 230 of the second mobile computing device 214 decodes the encoded output of the second instance 506 of the gaming application 502, such that graphical data corresponding to the second instance 506 of the gaming application 502 is displayed on the display screen 222 and audio data is output from speakers of the second mobile computing device 214.

Figure 8:
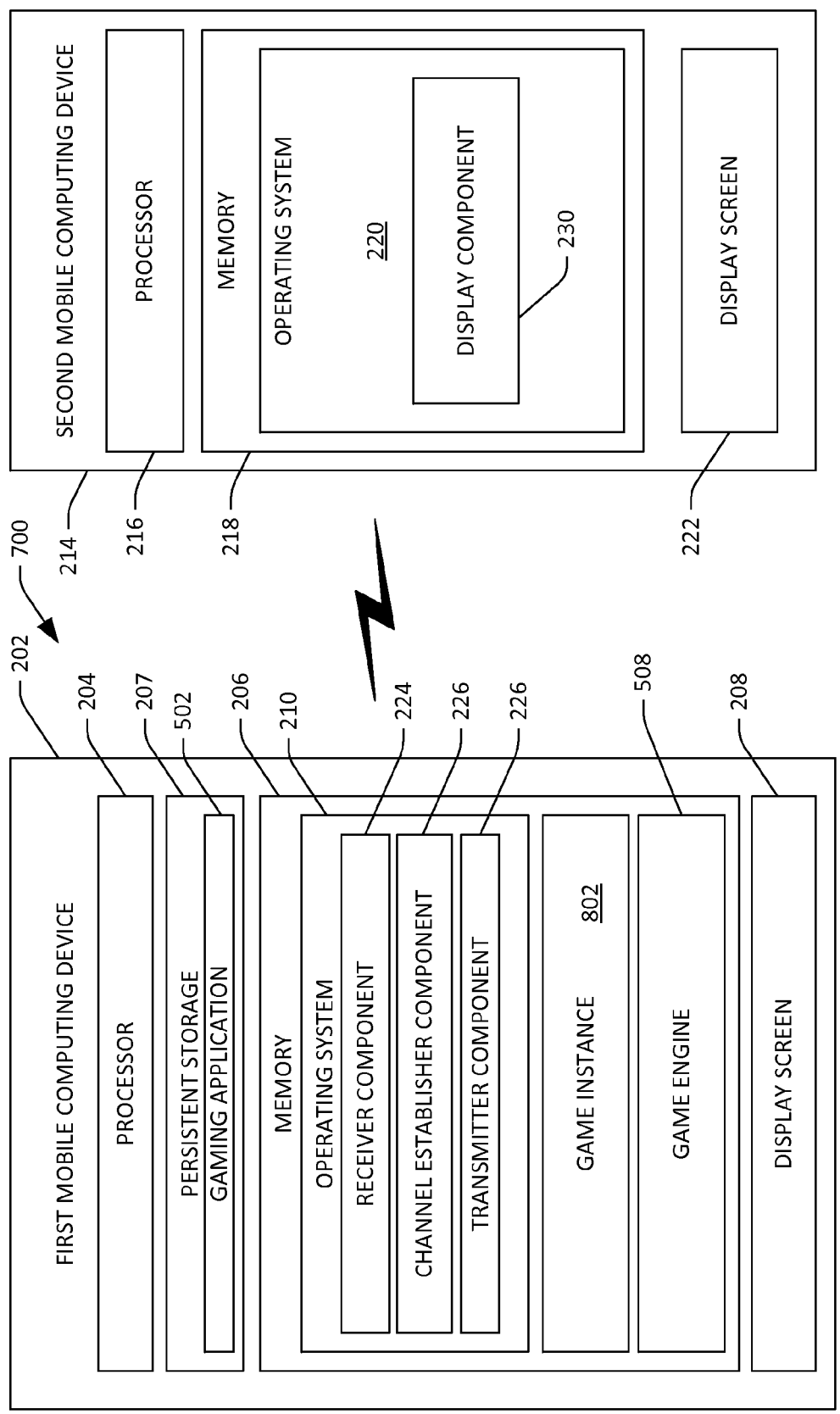
FIG. 8 illustrates an exemplary mobile computing device that has a gaming application installed thereon.

Turning now to FIG. 8, another exemplary system 800 that facilitates game sharing between mobile computing devices is illustrated. The system 800 includes the first mobile computing device 202 and the second mobile computing device 214. The first mobile computing device 202 has the gaming application 502 installed in the persistent storage 207 thereof. In the exemplary embodiment shown in FIG. 8, a developer of the gaming application 502 has configured the gaming application to allow for multiplayer gaming through use of a single game instance.

For example, the receiver component 224 can receive an indication that the gaming application 502 is desirably shared with the second mobile computing device 214. As described above, responsive to receiving such indication, the channel establisher component 226 can establish a communications channel between the first mobile computing device 202 and the second mobile computing device 214. Additionally, a game instance 802 can be loaded into the memory 206, and is executed by the processor 204. The game instance 802 has access to the game engine 508. The transmitter component 228 encodes and transmits at least some output data generated by the game instance 506 over the communications channel to the second mobile computing device 214.

In the embodiment shown in FIG. 8, the game instance 802 is configured to generate two separate streams of output data: a first stream of output data for display locally on the first mobile computing device 202 on the display screen 208 (as well as audio data output on the speakers of the first mobile computing device 202); and a second stream of output data that is encoded by the transmitter component 228 and transmitted to the second mobile computing device 214. The display component 230 decodes the encoded output data resulting in display of graphical data on the display screen 222 and audio data output on speakers of the second mobile computing device 214. The game instance 802 is additionally configured to receive separate input streams, one from, for example, interfaces of the first mobile computing device 202 and one from interfaces of the second mobile computing device 214. Both streams of output data can be updated based upon the streams of input data.

Figure 9:
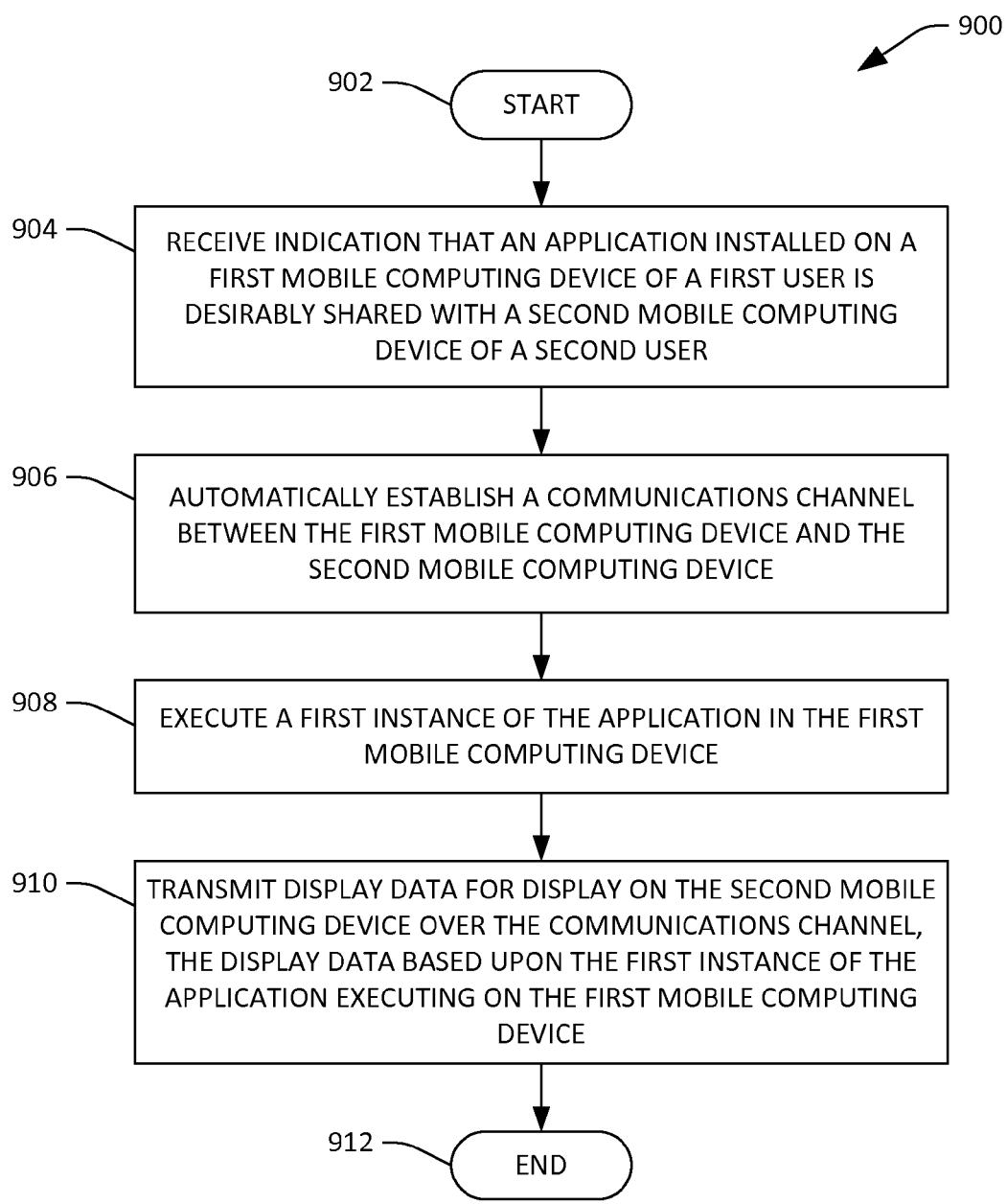
FIG. 9 is a flow diagram that illustrates an exemplary methodology for sharing an application installed on a mobile computing device with another computing device.
Figure 10:
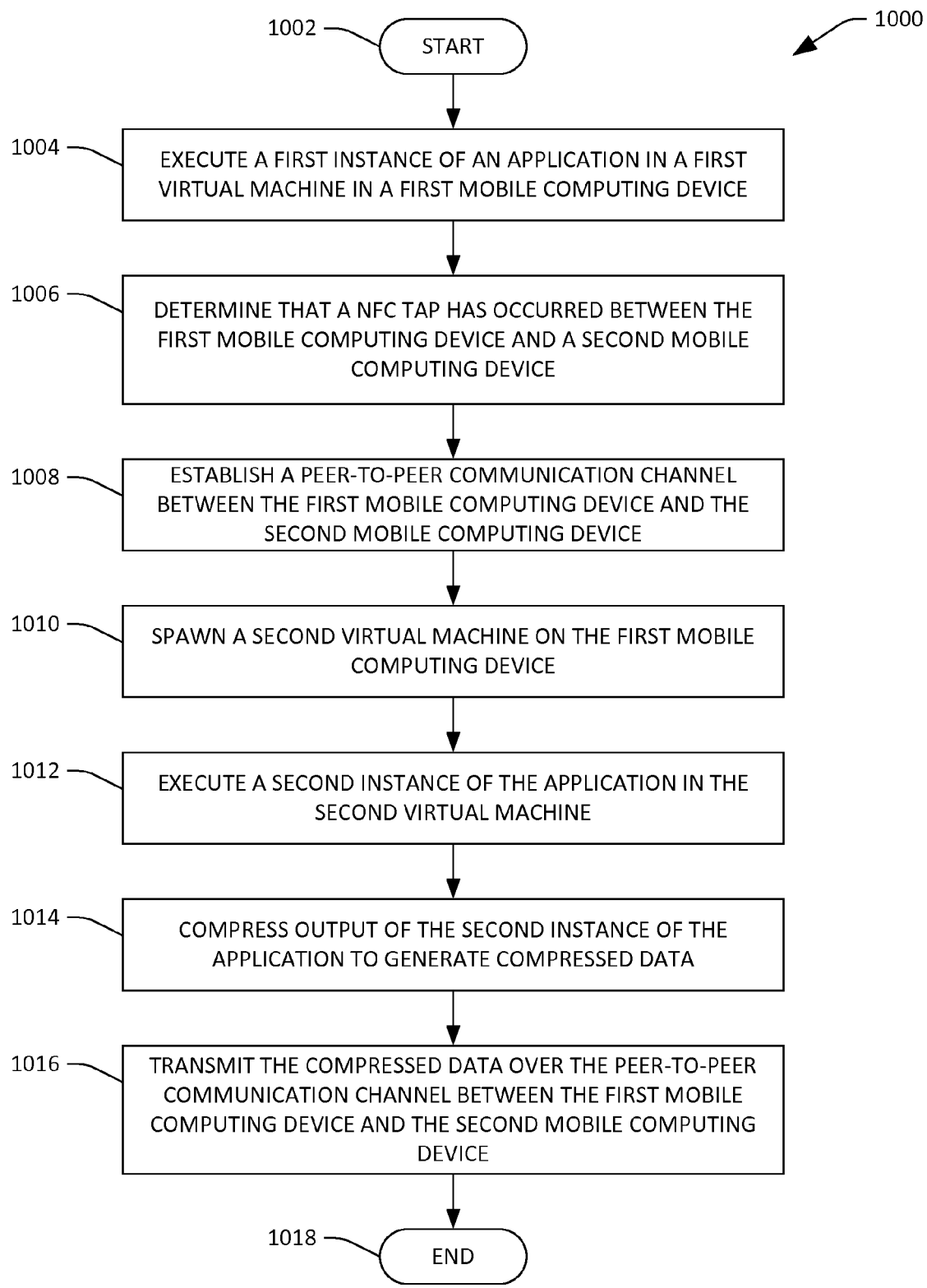
FIG. 10 is a flow diagram that illustrates an exemplary methodology for sharing an application installed on a first mobile computing device with a second mobile computing device.

With reference now to FIGS. 9-10, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 9, an exemplary methodology 900 that facilitates sharing of an application installed on a mobile computing device with another mobile computing device is illustrated. The methodology 900 starts at 902, and at 904 an indication is received that an application installed on a first mobile computing device of a first user is desirably shared with a second mobile computing device of a second user. As noted above, the first mobile computing device and the second mobile computing device can be mobile phones.

At 906, responsive to receiving the indication that the application installed on the first mobile computing device is desirably shared with the second mobile computing device, a communications channel is automatically established between the first mobile computing device and the second mobile computing device. Such communications channel can be a relatively high bandwidth, peer-to-peer communications channel, such as can be establish through utilization of Wi-Fi Direct or other suitable protocol.

At 908, responsive to receiving the indication that the application installed on the first mobile computing device is desirably shared with the second mobile computing device, a first instance of the application can be executed on the first mobile computing device. At 910, display data for display on the second mobile computing device is transmitted over the communications channel, wherein the display data is based upon the first instance of the application executing on the first mobile computing device. The methodology 900 completes at 912.

Turning now to FIG. 10, another exemplary methodology 1000 that facilitates sharing of an application installed on a first mobile computing device with a second mobile computing device (which does not have the application installed thereon) is illustrated. The methodology 1000 starts at 1002, and at 1004 a first instance of an application is executed in a first virtual machine in a first mobile computing device. At 1006, a determination is made that a NFC tap has occurred between the first mobile computing device and a second mobile computing device. Such NFC tap can indicate that the application is desirably shared with the second mobile computing device.

At 1008, responsive to determining that the NFC tap has occurred between the first mobile computing device and the second mobile computing device, a peer-to-peer communications channel is established between the first mobile computing device and the second mobile computing device.

At 1010, responsive to determining that the NFC tap has occurred between the first mobile computing device and the second mobile computing device, a second virtual machine is spawned on the first mobile computing device. At 1012, a second instance of the application is executed in the second virtual machine of the first mobile computing device.

At 1014, output data of the second instance of the application executing in the second virtual machine is encoded to generate encoded data, wherein the output data comprises data that is to be displayed on a display screen of the second mobile computing device and audio data that is desirably output from speakers of the second mobile computing device. At 1016, the encoded data is transmitted over the peer-to-peer communications channel between the first mobile computing device and the second mobile computing device. The second mobile computing device thus receives the encoded data, where it can be decoded and displayed/audibly replayed on the second mobile computing device. The methodology 1000 completes at 1018.

Figure 11:
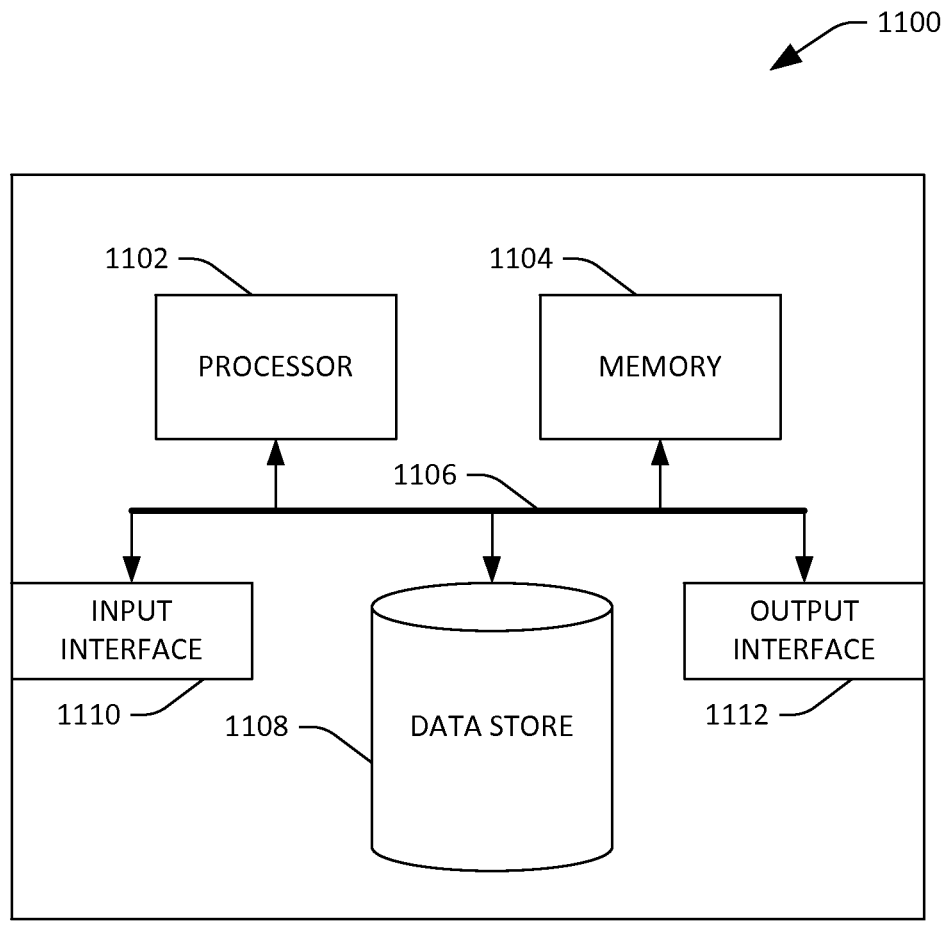
FIG. 11 is an exemplary computing system.

Now referring to FIG. 11, a high-level illustration of an exemplary computing device 1100 that can be used in accordance with the systems and methodologies disclosed herein is illustrated. For instance, the computing device 1100 may be used in a system that supports sharing of an application installed on a mobile computing device. In another example, at least a portion of the computing device 1100 may be used in a system that supports receiving display data over a communications channel established between mobile computing devices. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store output data, application states, etc.

The computing device 1100 additionally includes a data store 1108 that is accessible by the processor 1102 by way of the system bus 1106. The data store may be or include any suitable computer-readable storage, including a hard disk, memory, etc. The data store 1108 may include executable instructions, images, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method configured for execution on a first mobile computing device operated by a first user, the method comprising:
    at the first mobile computing device:
        receiving an indication that an application installed on the first mobile computing device is to be shared with a second mobile computing device operated by a second user;
        responsive to receiving the indication that the application installed on the first mobile computing device is to be shared with the second mobile computing device, establishing a direct communications channel between the first mobile computing device and the second mobile computing device;
        responsive to receiving the indication that the application installed on the first mobile computing device is to be shared with the second mobile computing device, executing a first instance of the application on the first mobile computing device;
        streaming display data for display on the second mobile computing device over the direct communications channel, the display data generated by the first instance of the application executing on the first mobile computing device, wherein the second mobile computing device fails to have the application installed thereon when the display data is streamed over the direct communications channel;

receiving an indication that the application is to be employed by the first user on the first mobile computing device; and responsive to receiving the indication that the application is to be employed by the first user on the first mobile computing device, executing a second instance of the application on the first mobile computing device, wherein the application is a multi-player game, and further wherein the display data streamed for display on the second mobile computing device is based upon the second instance of the application executing on the first mobile computing device.

2. The method of claim 1, further comprising: at the first mobile computing device, streaming audio data for replay on the second mobile computing device, the audio data generated by the first instance of the application executing on the first mobile computing device.

3. The method of claim 1, wherein the first mobile computing device is a mobile telephone.

4. The method of claim 1, further comprising:
at the first mobile computing device:
receiving input data from the second mobile computing device by way of the direct communications channel, the input data based upon interaction of the second user on the second mobile computing device with the display data streamed to the second mobile computing device;
providing the input data to the first instance of the application;
receiving updated state information from the first instance of the application executing on the first mobile computing device; and
streaming updated display data for display on the second mobile computing device, the updated display data based upon the updated state information from the first instance of the application executing on the first mobile computing device.

5. The method of claim 1, further comprising:
at the first mobile computing device:
receiving input from the first user with respect to the second instance of the application executing on the first mobile computing device;
receiving updated state information from the second instance of the application executing on the first mobile computing device; and
streaming updated display data for display on the second mobile computing device, the updated display data based upon the updated state information from the second instance of the application executing on the first mobile computing device.

6. The method of claim 1, the method further comprising:
at the first mobile computing device:
responsive to receiving the indication that the application installed on the first mobile computing device is to be shared with the second mobile computing device, spawning a first virtual machine, wherein the first instance of the application executes in the first virtual machine;
receiving an indication that the first user is to employ the application on the first mobile computing device; and
responsive to receiving the indication that the first user is to employ the application on the first mobile computing device, executing the second instance of the application in a second virtual machine.

7. The method of claim 1, wherein the first mobile computing device has a first operating system developed by a first developer installed thereon, and wherein the second mobile computing device has a second operating system developed by a second developer installed thereon.

8. The method of claim 1, wherein the receiving of the indication that the application is to be shared with the second mobile computing device of the second user comprises determining that the second mobile computing device is within a threshold distance from the first mobile computing device.

9. The method of claim 8, wherein the threshold distance is less than three inches.

10. The method of claim 8, wherein the receiving of the indication that the application is to be shared with the second mobile computing device comprises identifying that a near field communications tap has occurred between the first mobile computing device and the second mobile computing device.

11. The method of claim 1, wherein the direct communications channel is a WiFi direct communications channel.

12. The method of claim 1, further comprising:
at the first mobile computing device:
receiving output data from the first instance of the application executing on the first mobile computing device, the output data comprising the display data; and
encoding the output data prior to streaming the output data over the communications channel to the second mobile computing device.

13. A first mobile computing device, comprising:
at least one processor; and
memory that comprises instructions that, when executed by the at least one processor, cause the at least one processor to perform acts comprising:
receiving an indication that an application is to be shared with a second mobile computing device, wherein a first instance is being executed by the at least one processor;
establishing a direct communications channel between the first mobile computing device and the second mobile computing device responsive to receiving the indication that the application is to be shared with the second mobile computing device;
receiving an indication that the application is to be employed by the first user on the first mobile computing device;
responsive to receiving the indication that the application is to be employed by the first user on the first mobile computing device, executing a second instance of the application on the first mobile computing device, wherein the application is a multi-player game; and
transmitting display data generated by the second instance of the application being executed by the at least one processor of the first mobile computing device to the second mobile computing device for display on the second mobile computing device, the display data transmitted over the direct communications channel, and wherein the display data is based upon input data from the second mobile computing device received over the direct communications channel and provided to the second instance of the application being executed by the at least one processor of the first mobile computing device, the input data based upon user interaction with the second mobile computing device, wherein the second computing device fails to have the application installed thereon when the input data is received from the second mobile computing device.

14. The first mobile computing device of claim 13, the acts further comprising transmitting data to and receiving data from a web service associated with the application on behalf of a user of the second mobile computing device.

15. The first mobile computing device of claim 13, wherein the multi-player game is simultaneously played by a first user of the first mobile computing device and a second user of the second mobile computing device.

16. The first mobile computing device of claim 13, wherein the application, responsive to the indication that the application is to be shared with the second mobile computing device being received, spawns data that supports multi-viewer utilization of the application.

17. The first mobile computing device of claim 13, the acts further comprising transmitting audio data generated by the second instance of the application being executed on the first mobile computing device to the second mobile computing device for replay thereon.

18. A first mobile computing device comprising computer-readable memory, the computer-readable memory comprising instructions that, when executed by at least one processor of the first mobile computing device, cause the at least one processor to perform acts comprising:
   executing a first instance of an application installed on the first mobile computing device, wherein the application is a multi-player game;
   establishing a direct communications channel between the first mobile computing device and a second mobile computing device, the direct communications channel established in response to receipt of an indication that the application is to be shared by the first computing device with the second computing device;
   executing a second instance of the application on the first mobile computing device in response to receipt of the indication, wherein the second instance of the application generates display data when executed;
   transmitting the display data to the second mobile computing device over the direct communications channel, wherein the display data is to be displayed on a display of the second mobile computing device;
   providing input to the second instance of the application executing on the first mobile computing device based upon user interaction with the display data on the second mobile computing device, wherein the second instance of the application generates updated display data based upon the input to the second instance of the application, wherein the second mobile computing device fails to have the application installed thereon when the input is provided to the second instance of the application executing on the first mobile computing device; and
   transmitting, over the direct communications channel, updated display data for display on the second mobile computing device.

19. The first mobile computing device of claim 18, the acts further comprising displaying display data generated by the first instance of the application on a display of the first mobile computing device.

* * * * *